United States Patent [19]
Hermsen et al.

[11] Patent Number: 5,428,705
[45] Date of Patent: Jun. 27, 1995

[54] APPARATUS FOR STORING AND ORGANIZING SPLICED OPTICAL FIBERS

[75] Inventors: Eric J. Hermsen; George R. Steenton, both of Howell; Pina R. Schneider, Holmdel, all of N.J.

[73] Assignee: Keptel, Inc., Tinton Falls, N.J.

[21] Appl. No.: 219,930

[22] Filed: May 16, 1994

Related U.S. Application Data

[63] Continuation of Ser. No. 56,302, Apr. 30, 1993, Pat. No. 5,375,185.

[51] Int. Cl.6 .................................................. G02B 6/38
[52] U.S. Cl. .................................................... 385/135
[58] Field of Search ...................... 385/134, 135, 95, 99

[56] References Cited

U.S. PATENT DOCUMENTS

| | | | |
|---|---|---|---|
| 4,840,449 | 6/1989 | Ghandeharizadeh | 385/135 |
| 4,911,521 | 3/1990 | Ryuto et al. | 385/135 |
| 5,100,221 | 3/1992 | Carney et al. | 385/135 |
| 5,142,606 | 8/1992 | Carney et al. | 385/134 |
| 5,206,927 | 4/1993 | Finzel et al. | 385/135 |
| 5,285,515 | 2/1994 | Milanowski et al. | 385/135 |
| 5,311,612 | 5/1994 | Vincent et al. | 385/135 |

*Primary Examiner*—Frank Gonzalez
*Attorney, Agent, or Firm*—R. Gale Rhodes, Jr.

[57] ABSTRACT

Apparatus for storing and organizing spliced optical fibers into one of a plurality of in-line and butt splicing configurations and for imparting sufficiently large curvature to the curved portions of such optical fibers present during storing and organizing to prevent damage to the optical fibers, and a cover for such optical fibers upon being stored and organized.

2 Claims, 5 Drawing Sheets

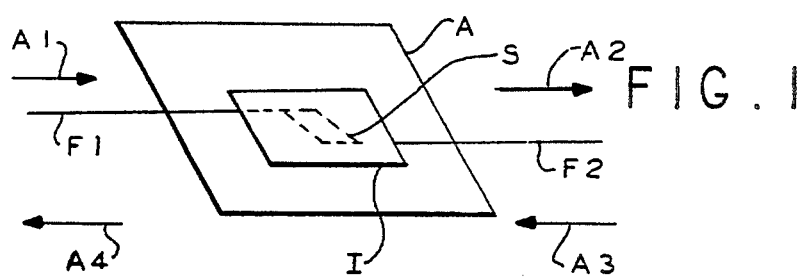
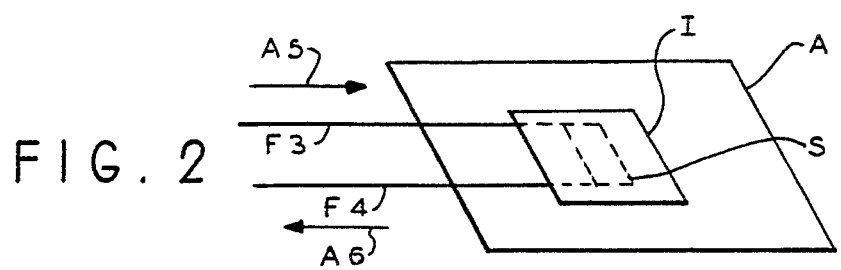
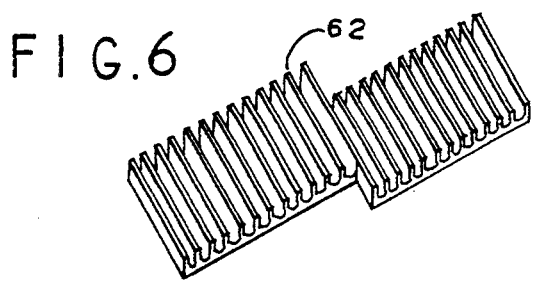
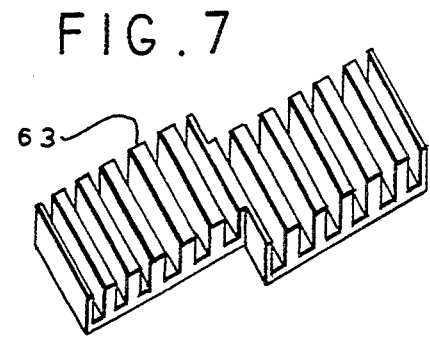
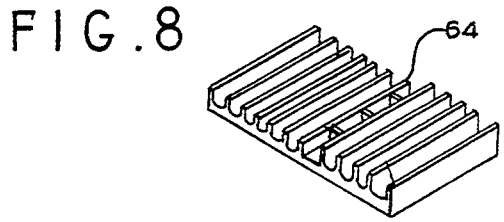
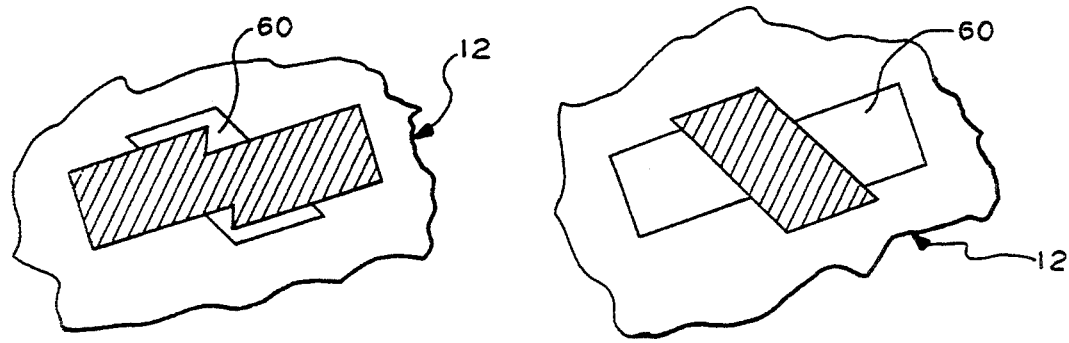

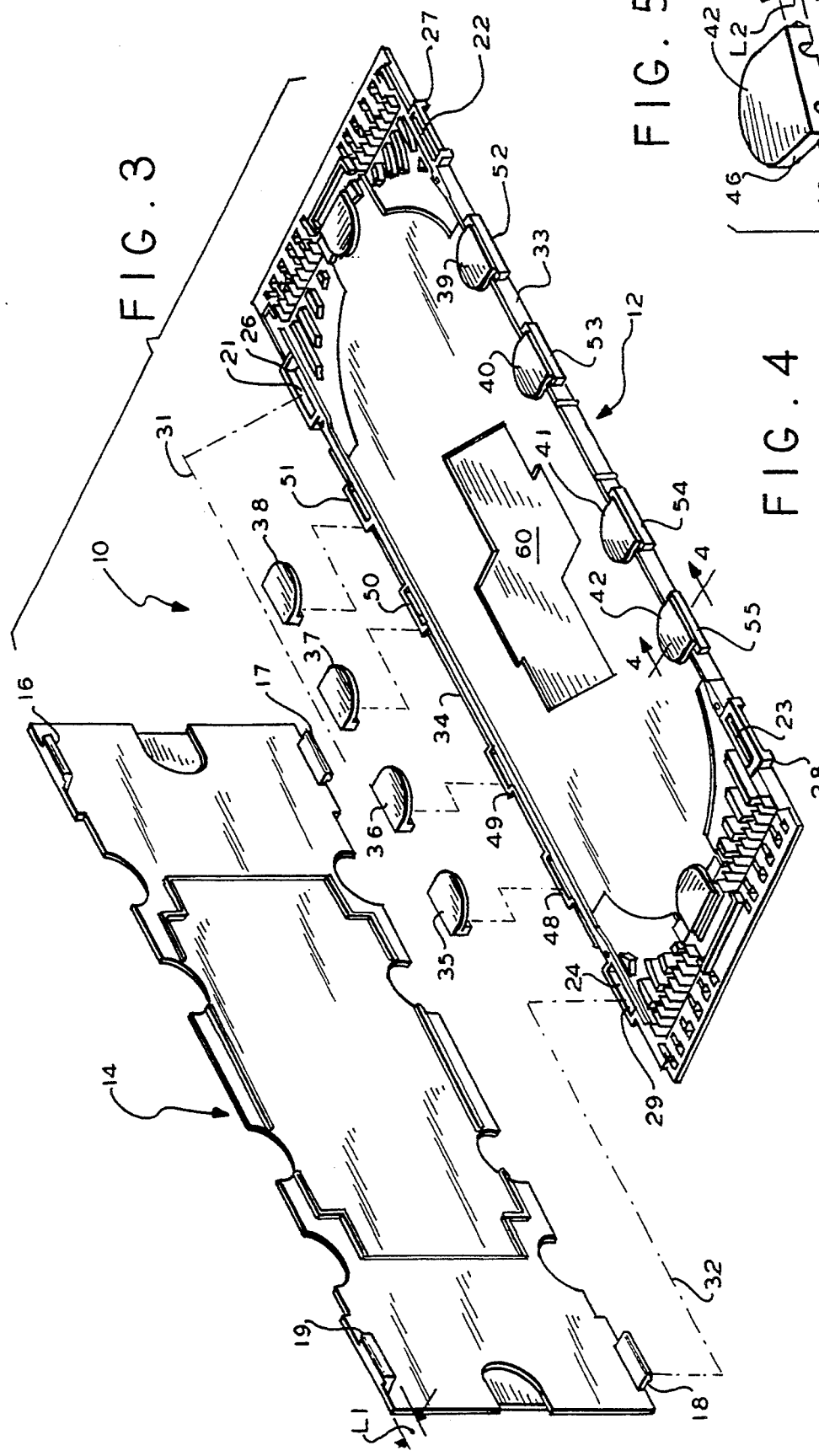
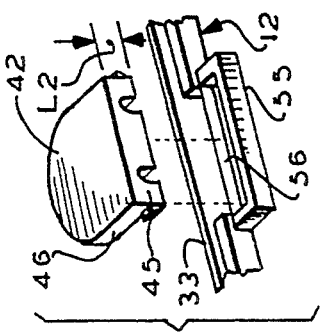

APPARATUS FOR STORING AND ORGANIZING SPLICED OPTICAL FIBERS

This is a continuation, of application Ser. No. 08/056,302, filed Apr. 30, 1993 now U.S. Pat. No. 5,375,185.

BACKGROUND OF THE INVENTION

This invention relates generally to apparatus known variously to the art as fiber optic splice trays, splice organizer trays, splice/drop closure, fiber optic splice closure system, fiber optic organizer trays, fusion splice tray etc., and such apparatus are referred to herein generally as apparatus for storing and organizing spliced optical fibers. The expression "spliced optical fibers" as used in this patent specification and in the appended claims is used to mean the splices between optical fibers and portions of the optical fibers, e.g. single fusion splices, mass ribbon fusion splices, mechanical splices adjacent such splices.

Numerous of such apparatus are known to the prior art, however, there exists a need in the art for new and improved apparatus for storing and organizing spliced optical fibers including one or more of the following features: a plurality of ports through which the optical fibers may either enter or exit the apparatus facilitating storing and organizing of spliced optical fibers in either butt or in-line configurations; a plurality of optical fiber splice receiving means, sometimes referred to in the art as splice inserts, providing grooves of different sizes for receiving splices having different transverse cross-sectional dimensions, e.g. diameters, such as is present with splices referred to in the art as single fusion, mass ribbon fusion, mechanical fusion; a plurality of covers which may be mounted to a base to provide different distances between the base and the cover for enclosing the aforementioned splices having different transverse cross-sectional dimensions, e.g. diameters; a plurality of such apparatus which may be stacked in an interlocking relationship.

SUMMARY OF THE INVENTION

It is the object of the present invention to satisfy the foregoing need in the art.

Apparatus satisfying such need and embodying the present invention may include means for storing and organizing spliced optical fibers into one of a plurality of in-line and butt splicing configurations including straight and curved portions and for imparting sufficiently large curvature to the curved portions to prevent damage thereto, and a cover for covering the spliced optical fibers upon being stored and organized.

DESCRIPTION OF THE DRAWINGS

FIG. 1 is a diagrammatical illustration of an in-line splicing configuration between two optical fibers;

FIG. 2 is a diagrammatical illustration of a butt splicing configuration between two optical fibers;

FIG. 3 is an exploded perspective view of a base, cover, and retaining members of apparatus embodying the present invention;

FIG. 4 is an enlarged cross-sectional view taken generally along the line 4—4 in FIG. 3 in the direction of the arrows;

FIG. 5 is an enlarged view in perspective illustrating the removable mounting of a retaining member to the base of the present invention;

FIG. 6 is a perspective view of a single fusion splice insert;

FIG. 7 is a perspective view of a mechanical splice insert;

FIG. 8 is a perspective view of a mass ribbon fusion insert;

FIGS. 9 and 10 are diagrammatical illustrations of the respective areas occupied by the various splice inserts upon being received in the irregularly shaped recess formed in the base;

DESCRIPTION OF THE PREFERRED EMBODIMENT

Figure 16:
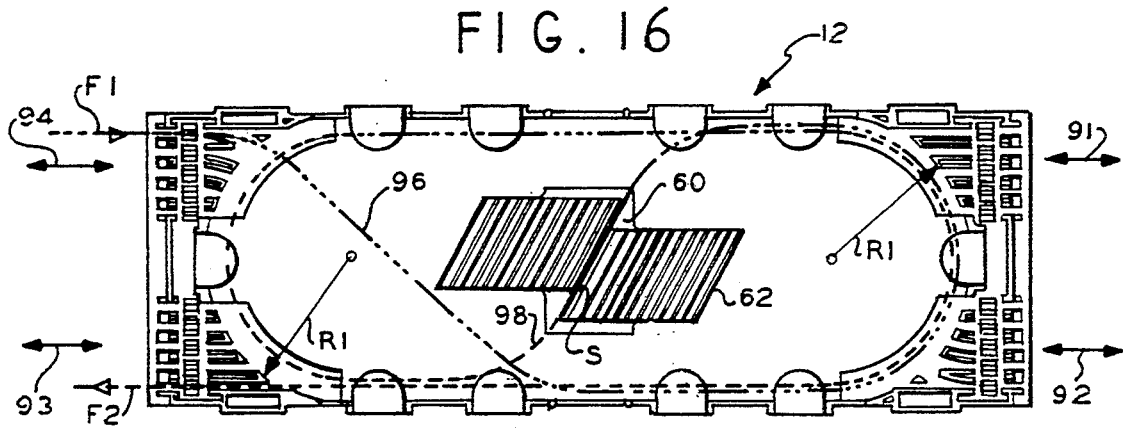
FIG. 16 is a plan view of the base illustrating diagrammatically a butt splicing configurations between two optical fibers according to the present invention.

Referring now to FIGS. 1 and 2, FIG. 1 is a diagrammatical illustration of an in-line splicing configuration between two optical fibers F1 and F2, and FIG. 2 is a diagrammatical illustration of a butt splicing configuration between optical fibers F3 and F4. In the in-line splicing configuration of FIG. 1, optical fiber F1 enters apparatus A for storing and organizing spliced optical fibers in the direction of the arrow A1, is spliced to optical fiber F2 by the splice or splice sleeve S residing in the splice insert I, and optical fiber F2 exits the apparatus A in the direction of the arrow A2; in such in-line splicing configuration it will be noted that optical fibers F1 and F2 enter and exit the apparatus A in the same direction as indicated by arrows A1 and A2. An alternative to such in-line splicing configuration is for optical fiber F2 to enter the apparatus A in the direction of the arrow A3, be spliced to the optical fiber F1 by the splice or splice sleeve S residing in the splice insert I, and for optical fiber F1 to exit the apparatus A in the direction indicated by the arrow A4. In this alternative in-line splicing configuration, it will be noted that the optical fibers F2 and F1 enter and exit the apparatus A in the same direction as indicated by the arrows A3 and A4. In the butt splicing configuration of FIG. 2, the optical fiber F3 enters the apparatus A in the direction of the arrow A5, is spliced to the optical fiber F4 by the splice or splice sleeve S residing in the splice insert I and optical fiber F4 exits the apparatus A in the opposite direction to the direction of entry of the optical fiber F3 into the apparatus A as indicated by the arrow A6. It will be understood that in a butt splicing configuration, the optical fibers F3 and F4 enter and exit the apparatus A in the opposite directions as indicated by the arrows A5 and A6. It will be further understood that an alternative butt splicing configuration would be for optical fibers F3 and F4 to enter and exit the apparatus A on the side opposite to that shown in FIG. 2 with the optical fibers F3 and F4 entering and exiting the apparatus A in the opposite directions.

Referring now to FIG. 3, apparatus embodying the present invention is shown and indicated by general numerical designation 10. Generally, apparatus 10 is for storing and organizing spliced optical fibers, e.g. optical fibers F1 and F2 shown in FIG. 12, into one of a plurality of in-line or butt splicing configurations including straight and curved portions and for imparting sufficiently large curvature to such curved portions to prevent damage thereto such as breakage or fracture. Apparatus 10 includes a generally rectangular base indicated by general numerical designation 12 and a generally rectangular cover indicated by general numerical designation 14. The cover 14 is for being mounted removably to the base 12 to cover spliced optical fibers stored and organized on the base 12 in the manner described in detail below and shown in other FIGS. The cover 14 is mounted removably to the base 12 by being provided with a plurality of outwardly extending members 16, 17, 18 and 19 for being wedgedly received respectively in the openings 21, 22, 23 and 24 formed respectively in the members 26, 27, 28 and 29 extending outwardly from the base 12; the representative wedged receptions of the cover members 17 and 18 in the base openings 21 and 24 are indicated by the lines 31 and 32 respectively in FIG. 3. The members 16, 17, 18 and 19 mount the cover 14 to the base 12 at a distance or height determined, for example, by the length L1 of the representative member 19 as shown in FIG. 3. Accordingly, such members 16–19 are also spacing members for spacing the cover 14 a certain distance from the base 12.

The base 12, FIG. 3, includes opposed side portion 33 and 34 to which are removably mounted a plurality of optical fiber retaining members 35 . . . 42 for facilitating retention of spliced optical fibers on the base 12 upon being stored and organized thereon as described in detail below and shown in other FIGS. Each such retaining member, as illustrated in cross-section in FIG. 4 by representative retaining member 42, includes an outwardly or downwardly extending member such as member 45 and an inwardly extending member 46. The opposed side portions 33 and 34 are provided with a plurality of outwardly extending members 48 . . . 55 which provide a plurality of openings for wedgedly and removably receiving the outwardly or downwardly extending members, e.g. member 45, of the retaining members 35 . . . 42 as illustrated in FIG. 5 by representative outwardly or downwardly extending member 55 for wedgedly and removably receiving the outwardly or downwardly extending member or portion 45 of representative retaining member 42. It will be noted that representative outwardly or downwardly extending member 45 may be provided with a plurality of inwardly extending grooves as shown in FIG. 5 which provide a degree of flexibility to the outwardly or downwardly extending member 45 to enhance its being wedgedly received in the opening 56. Since the length or height L2 of the outwardly or downwardly extending member 45 of the representative retaining member 42 shown in FIG. 5 determines the distance at which the inwardly extending member 46 is mounted from the base 12, the member 45 is both a mounting and spacing member.

An inwardly extending recess 60, FIG. 3, is formed generally centrally in the base 12. Recess 60 is of irregular configuration for receiving, alternatively, the single fusion splice insert 62, the mechanical splice insert 63 and the mass ribbon fusion splice insert 64 shown respectively in FIGS. 6, 7 and 8. Upon the single fusion splice insert 62 of FIG. 6 being mounted in the recess 60 shown in FIG. 3, the single fusion splice insert occupies the cross-sectional area of the recess 60 as shown in FIG. 9 and upon the mechanical splice insert 63 of FIG. 7 being mounted in the recess 60 the mechanical splice insert 63 will also occupy the cross-sectional area shown in FIG. 9. Upon the mass ribbon fusion splice insert 64 of FIG. 8 being mounted in the recess 60 of FIG. 3, the mechanical splice insert 64 will occupy the cross-sectional area shown in FIG. 10.

It will be understood that the splice inserts 62, 63 and 64 are provided on their rear surfaces, not shown, with a layer of suitable adhesive covered by a suitable release layer, not shown, which release layer may be peeled away to permit the inserts to be adhered in the recess 60. Such splice inserts are for receiving and holding, such as for example at least in a slight wedged engagement, the various splices between optical fibers. More particularly, splice insert 62 is provided with the grooves shown which are dimensioned in transverse cross-section to receive single fusion splices, of the type known to the art, between optical fibers, splice insert 63 is provided with larger grooves dimensioned in transverse cross-section for receiving mechanical splices, of the type known to the art, between optical fibers, and insert 64 of FIG. 8 is provided with a plurality of lower grooves dimensioned in transverse cross-section for receiving and holding single fusion splices between optical fibers and is provided with a plurality of larger upper grooves dimensioned in transverse cross-section for receiving and holding mass ribbon fusion splices, of the type known to the art, between ribbon or ribbonized optical fibers. As is understood by those skilled in the art, the transverse cross-sectional dimension of a mechanical splice and the transverse cross-sectional dimension of a mass ribbon fusion splice is substantially the same as indicated by the larger grooves provided in the mechanical insert splice insert 63 of FIG. 7 and the larger grooves provided in the mass fusion insert 64 of FIG. 8 but the transverse cross-sectional dimension of a single fusion splice is smaller as indicated by the smaller grooves in FIG. 6; such transverse cross-sectional dimensions are typically diameters.

Figure 11:
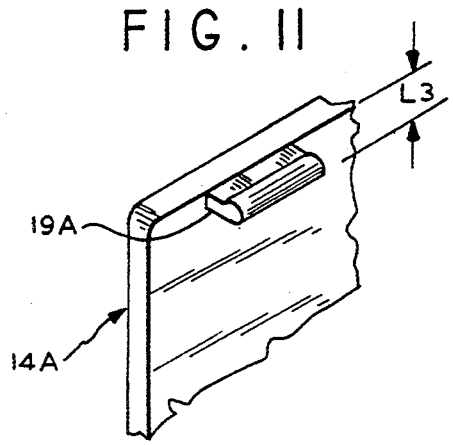
FIG. 11 is a perspective view of a portion of an alternate cover of the present invention.

Accordingly, it will be further understood that the apparatus 10 of the present invention may include at least two covers for being mounted removably to the base 12 of FIG. 3 at different distances to accommodate the different transverse cross-sectional dimensions of the splices which may be received by the different splice inserts which may be mounted in the base recess 60. Such covers may be the cover 14 shown in FIG. 3 and the cover 14A partially shown in FIG. 11. It will be understood that the cover 14, FIG. 3, is for covering the base 12 upon the single fusion splice insert 62 being mounted in the recess 60. Accordingly as noted above with regard to representative member 19, the outwardly extending members 16, 17, 18 and 19 provided on the cover 14 are provided with length L1 for engaging the base 12 and spacing the cover 12 a distance therefrom substantially equal to the length L1 to accommodate the reception of the single fusion splices by the single fusion splice insert 62 upon the splice insert 62 being mounted in the recess 60. Alternatively, upon the mechanical splice insert 63 of FIG. 7 being mounted in the recess 60 or upon the mass ribbon fusion splice insert 64 of FIG. 8 being mounted in the recess 60 of the base 12, cover 14A of FIG. 11 is mounted removably to the base 12 and cover 14A is provided with a plurality of outwardly extending members, note representative outwardly extending member 19A in FIG. 11, provided with a length 12 greater than length L1 (FIG. 3) provided to the spacing members 16 . . . 19 provided on the cover 14, to accommodate the reception of mechanical splices by the mechanical splice insert 63 or to accommodate the reception of the mass fusion splices by the mass fusion splice insert 64 of FIG. 8 upon splice insert 64 being mounted to recess 60.

Figure 5A:
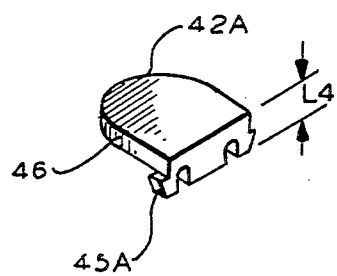
FIG. 5A is a view similar to FIG. 5 but showing an alternate embodiment of a removable retaining member of the present invention.

Similar to the two covers 14 and 14A, it will be further understood that the apparatus 10 of the present invention may include at least two sets of optical fiber retaining members, the first set including retaining members 35 . . . 42 shown in FIG. 3 and provided with spacing members represented by the spacing member 45 provided with the length L2 as shown in FIG. 5, and with a second set of optical fiber retaining members, not shown, but which are illustrated by representative retaining member 42A shown in FIG. 5A provided with the spacing member 45A having a length L4 greater than the length L2 of FIG. 5. It will be understood that the first set of retaining members 35 . . . 49 are mounted removably to the base 12 as described above upon the single fusion splice insert 62 being mounted in the recess 60 to accommodate the reception of the single fusion inserts by the splice insert 62, and that upon the mechanical splice insert 63 or the mass ribbon fusion splice insert 64 being mounted in the recess 60 the second set of optical fiber retaining members, illustrated by representative retaining member 42A of FIG. 5A, are mounted removably to the base 12 to accommodate the reception of the mechanical splices by the mechanical splice insert 63 and to accommodate the reception of the mass ribbon fusion splices by the insert 64.

Figure 12A:
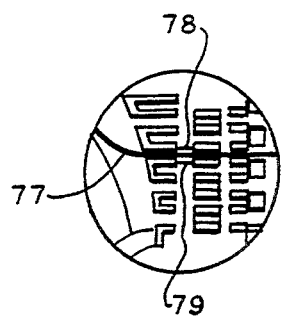
FIG. 12A is a partial view of a portion of a corner of the base illustrating strain relief members which may be used with ribbon or ribbonized optical fibers.
Figure 12:
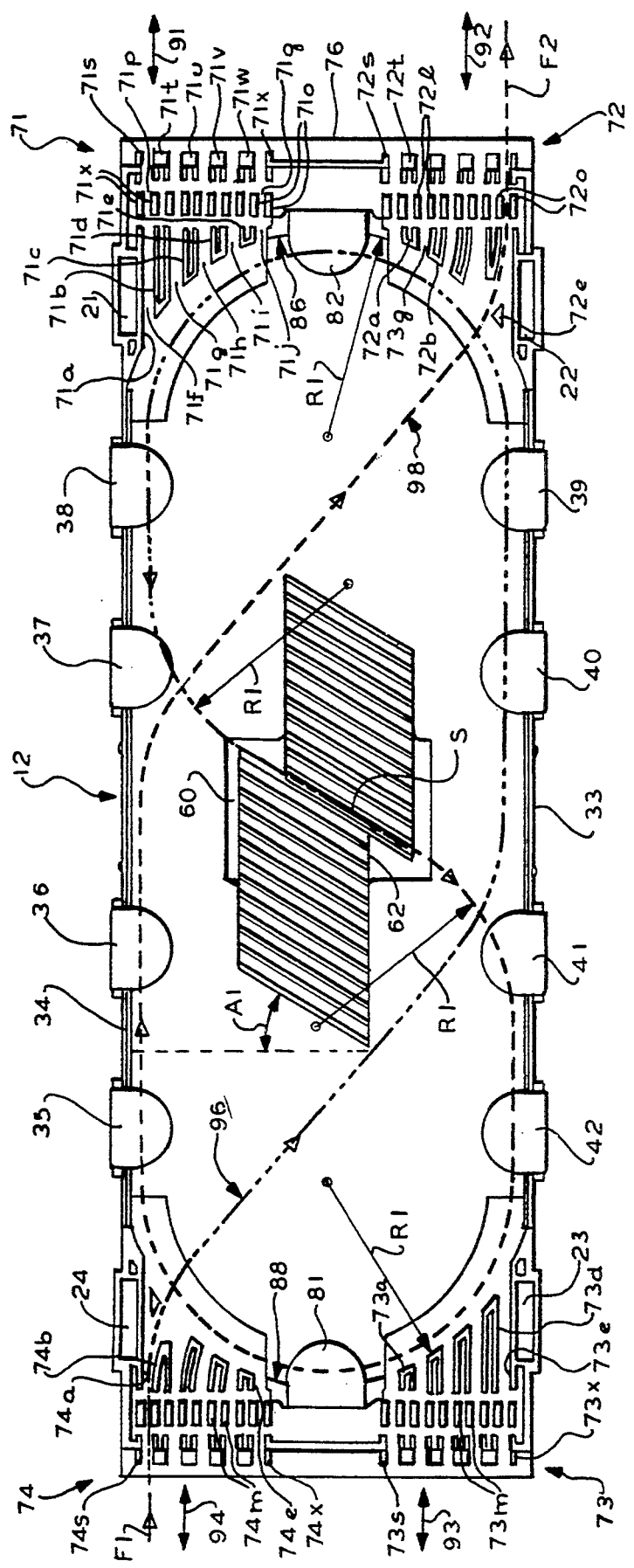
FIG. 12 is an enlarged plan view showing in detail the structure of the base and illustrating diagrammatically an in-line splicing configuration between two optical fibers according to the present invention.

Referring now to FIG. 12, it will be understood that the base 12 includes four corner portions indicated by general numerical designations 71, 72, 73 and 74. It will be further generally understood that each corner portion is provided with a plurality of upwardly extending members providing grooves therebetween for receiving the optical fibers upon the fibers entering or exiting the base 12. As shown in FIG. 12, representative corner portion 71 is provided with a plurality of upwardly or outwardly extending members 71a . . . 71e providing a plurality of grooves therebetween 71f . . . 71j therebetween for receiving the optical fibers upon the optical fibers entering or exiting the base means through corner portion 71. Corner portion 71 is further provided with pairs of upwardly extending members 71k . . . 71o located intermediate the plurality of outwardly extending members 71a . . . 71e and the edge or end 76 of the base 12. Only pairs of upwardly extending members 71k and 71o are identified in FIG. 12 to reduce the number of numerical designations shown. These representative pairs of upwardly extending members 71k . . . 71o provide grooves therebetween, note groove 71p between pair of members 71k and groove 71q between pairs 71o, for wedgedly and removably receiving optical fiber bundles entering and exiting the corner portion 71; the pairs of such members, e.g. pair 71k, are snap members because the members are sufficiently resilient to permit the optical fiber bundles to be snap-fitted therebetween. As is known to those skilled in the art, individual optical fibers are typically bundled into a buffer tube, a plurality of which are typically bundled into an outer sheath or jacket, or bundled into a spiral wrapped bundle and it will be understood that the pairs of upwardly extending members 71k . . . 71o are spaced apart distances to cause these pairs of upwardly extending members to wedgedly receive such bundles or jackets and facilitate securing them, and thereby the individual optical fibers contained therein, to the base 12. Further, corner 71 is provided with a plurality of openings or holes 71s . . . 71x extending through the base 12 intermediate the pairs of upwardly extending members 71k . . . 71o and the outer edge or end 76. The openings or holes 71s . . . 71x are for receiving tie wraps, or the like, for further securing the optical fiber bundles, particularly the bundles thereof noted above, to the base 12. It will be understood that upon the optical fibers being ribbon or ribbonized optical fibers 77 shown in FIG. 12A, pairs of strain relief members, such as strain relief members 78 and 79, may be included to provide strain relief for the ribbon or ribbonized optical fibers 77 upon their entry or exit from the corner portions of the base.

In the same manner as corner portion 71, the other corner portions 72, 73 and 74 of the base 12 are provided with pluralities of upwardly extending members providing grooves therebetween for receiving the optical fibers entering or exiting such corners, are provided with pairs of upwardly extending snap members and openings for receiving the tie wraps and the like. However, for the sake of reducing the number of numerical designations shown on FIG. 12, only representative outwardly extending members, snap members and holes or openings are identified in corner portions 72, 73 and 74

As may be further understood from FIG. 12, in addition to the retaining members 35 . . . 42 being mounted removably to the base 12 described above, the base 12 may be provided with additional opposed pairs of optical fiber retaining members 81 and 82 which may be formed integrally with the base 12.

As may be further understood by reference to FIG. 12, the inner ends of the plurality of upwardly or outwardly extending members 71a . . . 71e formed in corner 71, and the inner ends of the plurality of upwardly or outwardly extending members 72a . . . 72e are shaped as shown to cooperatively form an interrupted generally semi-circular surface indicated diagrammatically by general designation 86 and which curved surface is provided with a radius of curvature R1. In the preferred embodiment, the radius of curvature R1 is approximately equal to 1.75 inches which, as is further known to those skilled in the art, is the minimum bend radius of typical optical fibers for preventing damage to the optical fibers, e.g. breakage or fracture, upon the optical fibers being bent or provided with a curved shape or configuration. Similarly, as will be further understood from FIG. 12, the inwardly extending end portions of the outwardly or upwardly extending members 74a . . . 74e in corner 74, and members 73a . . . 73e in corner 73, are provided with a shape which provides a second interrupted, generally semi-circular surface indicated diagrammatically by general designation 88 and which surface is also provided with the minimum bend radius R1 as shown. It will be further understood from FIG. 12 that the grooves for receiving the optical fiber splices are formed in the splice insert 62 at an angle A1 as shown with respect to the side portions 33 and 34 of the base 12, such that the optical fibers F1 and F2 upon being bent at their entry and exit directly from the splice and splice insert 62 are also provided with the minimum bend radius R1 as shown; similarly, the grooves formed in the splice insert 63 are formed at the angle A1 with respect to the base side portions 33 and 34.

Referring still to FIG. 12, it will be understood within the context of the present invention, and with regard to representative corner portion 71, the plurality of upwardly or outwardly extending members 71a ... 71e, and snap pairs 71k ... 71o, and openings 71s ... 71x, individually or cooperatively, form an input/output port indicated by the double headed arrow identified by general numerical designation 91, and through which input/output port 91 optical fibers may either enter or exit the base 12. Similarly, it will be understood that the corner portions 72, 73 and 74 are also provided with input/output ports 92, 93 and 94 through which optical fibers also may enter or exit the base 12. It will be further noted from FIG. 12 that the input/output ports 91 ... 94 are disposed at the four corner portions 71 ... 74 of the base 12 in the general form or nature of a quadrangle and hence it will be understood that the plurality of input/output ports 91 ... 94 are disposed quadrangularly on the base 12.

An in-line optical fiber splicing configuration is also illustrated diagrammatically in FIG. 12 between optical fiber F1 which enters the base 12 through input/output port 94, is spliced to the optical fiber F2 by the splice or splice sleeve S residing in one of the grooves of the splice insert 62, and which optical fiber F2 exits the base 12 through input/output port 93. Entering optical fiber F1 is illustrated by the dashed line identified by general numerical designation 96 and comprised of the long and short dashed lines as shown. Exiting optical fiber F2 is identified by general numerical designation 98 and is comprised of the interrupted lines of equal length as shown. It will be understood from FIG. 12, with regard to entering optical fiber F1, that the groove between the upwardly extending members 74a and 74b, the interrupted generally semi-circular surface 86 and the angularly disposed groove of the splice insert 62 in which the splice or splice sleeve S resides provides optical fiber F1, upon being stored and organized on the base 12, with a path including straight and curved portions as shown, and it will be particularly noted that the interrupted generally semi-circular surface 86 and the angularly disposed groove in which the splice or splice sleeve S resides impart curved portions to the optical fiber F1 which curved portions are provided with the minimum bend radius R1 for preventing the above-noted damage, e.g. breakage or fracture, to the optical fiber F1. Similarly, it will be noted from FIG. 12 that the optical fiber F2 exiting the input/output port 93 is provided with a path including straight and curved portions as shown, and it will be further particularly noted that the interrupted generally semi-circular surface 88 and the angularly disposed groove in which the splice or splice sleeve S resides impart the curved portions of such path and provide such curved portions with the minimum bend radius R1 as shown for noted optical fiber damage prevention. It will be further understood from FIG. 12 that the optical fibers F1 and F2 are stored and organized on the base 12 in such in-line splicing configuration wherein the optical fibers F1 and F2 are provided with, or include, straight and curved portions as shown by the dashed lines 96 and 98. It will be particularly understood that the angularly disposed grooves formed in the splice insert 62 and the opposed interrupted generally semi-circular surfaces 86 and 88 impart generally semi-circular configurations to the optical fibers F1 and F2 having the minimum bend radius R1 for prevention of damage to the optical fibers occupying such curved configurations. For clarity of presentation only single dashed lines 96 and 98 representing the entering and exiting fibers F1 and F2 are shown, but it will be understood that multiple lengths or loops of such optical fibers may generally occupy the lines 96 and 98 whereby multiple lengths or loops of such optical fibers may be stored and organized on the base 12 to provide spare lengths or loops for further or additional splicing.

Figure 13:
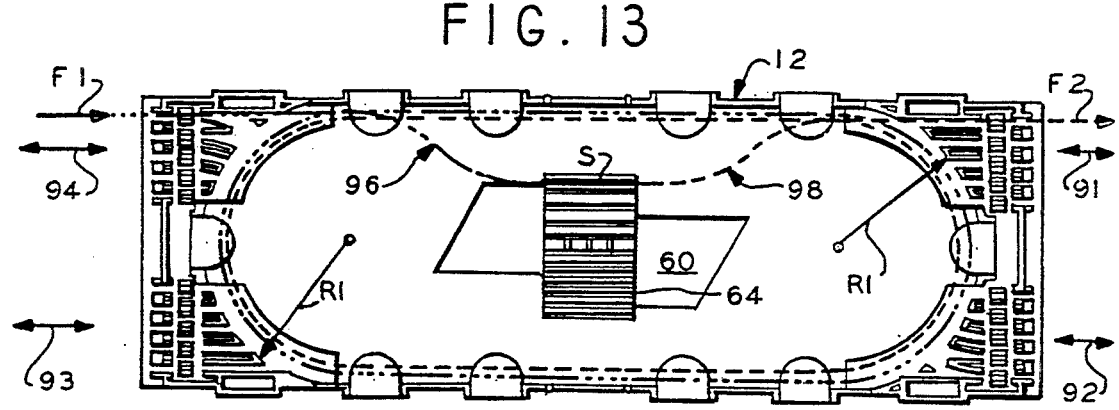
FIGS. 13, 14 and 15 are plan views of the base illustrating diagrammatically additional in-line splicing configurations between two optical fibers according to the present.
Figure 14:
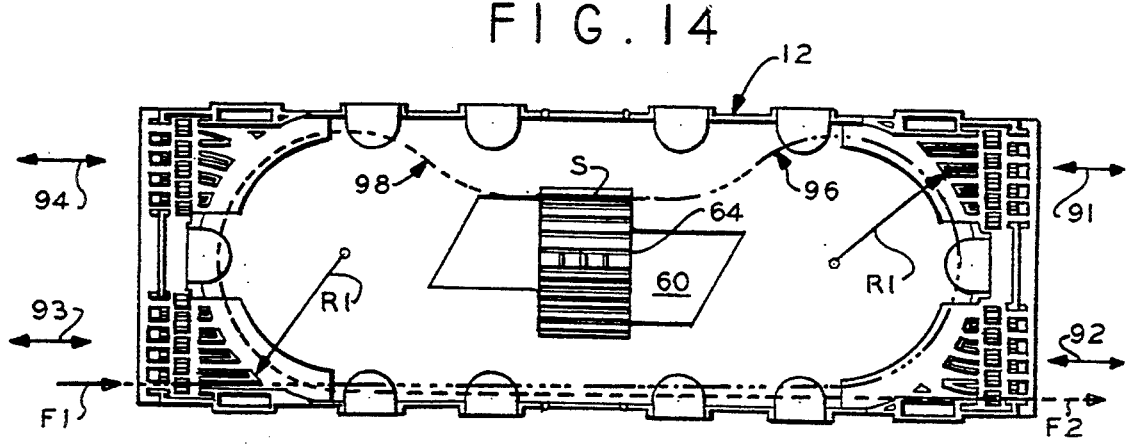
Figure 15:
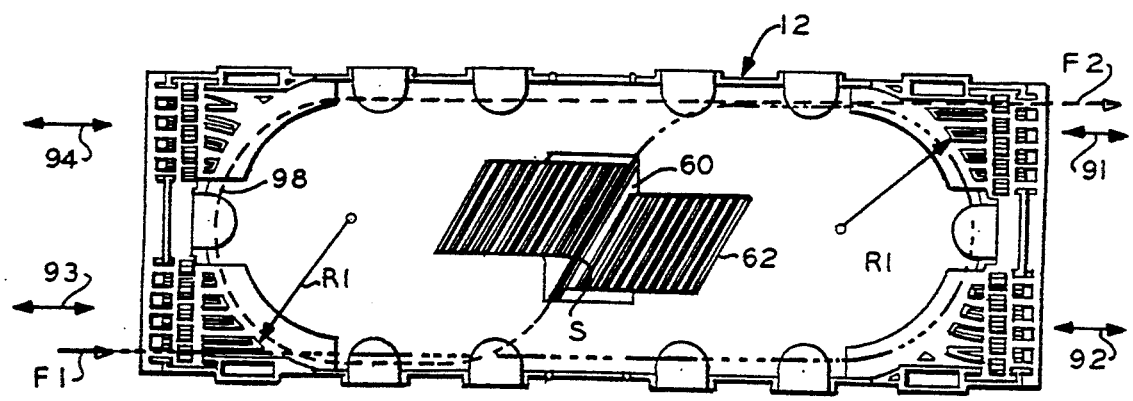

Other examples of the in-line splicing configurations between optical fibers provided by the apparatus of the present invention are illustrated diagrammatically in FIGS. 13, 14 and 15. FIG. 13 illustrates in-line splicing configuration between, for example, entering ribbon or ribbonized optical fiber F1 and exiting ribbon or ribbonized optical fiber F2. In this example, it will be understood, that mass ribbon fusion splice insert 64 is mounted in the recess 60 of the base 12. In this in-line splicing configuration, the entering optical fiber F1 enters the input/output port 94, is spliced to the exiting optical fiber F2 by the mass ribbon fusion splice or splice sleeve S and the optical fiber F2 exits the input/output port 91. As shown, such optical fibers are provided, upon being stored and organized on the base 12, with paths including straight and curved portions and it will be understood, as described above with regard to the in-line splicing configuration illustrated in FIG. 12, that the curved portions of such paths are provided with the minimum bend radius R2 for optical fiber damage prevention. It will be further understood from FIG. 13 that the entering optical fiber F1 may make a plurality of loops around the interior of the base 12 before being spliced to the exiting optical fiber F2 by the splice or splice sleeve S and that the exiting optical fiber F2 may also make a plurality of loops around the interior of the base 12 before exiting the input/output port 91. Such additional loops provide optical fiber storage to permit further or additional splicing between such optical fibers and other optical fibers if desired. FIG. 14 is similar to FIG. 13 except that in the in-line splicing configuration illustrated diagrammatically in FIG. 14 the entering ribbon or ribbonized optical fiber F1 enters input/output port 93, is spliced by splice or splice sleeve S residing in the mass ribbon fusion splice insert 64 to the exiting ribbon or ribbonized optical fiber F2 which exits the input/output port 92.

A further diagrammatical illustration of in-line splicing configuration for optical fibers which may be provided by the apparatus of the present invention is shown in FIG. 15 wherein entering optical fiber F1 enters the base 12 through input/output port 93, is spliced by the splice or splice sleeve S to the exiting optical fiber F2 which exits the input/output port 91.

FIG. 16 illustrates an example of butt splicing configuration for spliced optical fibers provided by the apparatus of the present invention. In this butt splicing configuration, entering optical fiber F1 enters input/output port 94, is spliced to the exiting optical fiber F2 by the splice or splice sleeve S and exiting optical fiber F2 exits the base 12 through input/output port 93 as shown; another example of butt splicing configuration provided by the present invention would be for optical fiber F2 to enter the input/output port 93 and for the optical fiber F1 to exit the input/output port 94.

Another example of a butt splicing configuration for optical fibers provided by the present invention may be understood by FIG. 16 whereby it will be understood that, although not shown, the entering optical fiber F1 may enter input/output port 91 and the exiting optical fiber F2 may exit the input/output port 92.

It will be understood that the covers 14 and 14A, retaining members e.g. 35 . . . 42, may be made of a suitable plastic such as polycarbonate and may be made, for example, by injection molding. It will be further understood that the splice inserts 62, 63 and 64 may be made of a suitable material known to the art having sufficient rigidity to give the definition for the splice insert shown and which has sufficient flexibility to provide the wedged receipt of the splices described above.

It will be understood by those skilled in the art that many variations and modifications may be made in the present invention without departing from the spirit and the scope thereof.

What is claimed is:

1. Apparatus for storing and organizing spliced optical fibers, comprising:

base means for storing and organizing said spliced optical fibers into in-line and butt splicing configurations including straight and curved portions;

curvature imparting means provided on said base means for imparting sufficiently large curvature to said curved portions of said optical fibers to prevent damage thereto; and cover means for covering said optical fibers upon being stored and organized by said base means.

2. Apparatus for storing and organizing spliced optical fibers, comprising:

base means for storing said spliced optical fibers, said base means provided with a plurality of upwardly extending members providing grooves therebetween for receiving said optical fibers and for organizing said optical fibers into in-line and butt splicing configurations including straight and curved portions; and curvature imparting means extending upwardly from said base means for imparting sufficiently large curvature to said curved portions of said optical fibers to prevent damage thereto.

* * * * *